United States Patent
Gabelli et al.

[11] Patent Number: 5,529,401
[45] Date of Patent: Jun. 25, 1996

[54] ROLLING ELEMENT BEARING COMPRISING AN OIL CONTAINING MATRIX

[75] Inventors: Antonio Gabelli, Ijsselstein; Gerardus De Vries; Bob C. Klijnveld, both of Nieuwegein; George T. Y. Wan, Houten, all of Netherlands

[73] Assignee: SKF Industrial Trading and Development Company B.V., Nieuwegein, Netherlands

[21] Appl. No.: 347,152

[22] Filed: Nov. 22, 1994

[30] Foreign Application Priority Data

Nov. 22, 1993 [NL] Netherlands ............................ 9302019

[51] Int. Cl.⁶ .................................................... F16C 33/56
[52] U.S. Cl. .......................... 384/470; 384/463; 384/527; 384/902
[58] Field of Search .................................. 384/470, 463, 384/465, 527, 902

[56] References Cited

U.S. PATENT DOCUMENTS

| 3,645,269 | 3/1972 | McKee ..................................... | 384/470 |
| 3,647,592 | 2/1972 | Flandrena ............................... | 384/470 |
| 4,073,552 | 2/1978 | Christy .................................... | 384/470 |
| 4,534,871 | 8/1985 | Johnson .............................. | 384/463 X |

FOREIGN PATENT DOCUMENTS

| 0012447 | 6/1980 | European Pat. Off. . | |
| 2838330 | 3/1980 | Germany . | |
| 3315644 | 10/1984 | Germany . | |
| 109824 | 8/1980 | Japan ..................................... | 384/463 |
| 135175 | 6/1974 | United Kingdom . | |
| 2004601 | 4/1979 | United Kingdom . | |

Primary Examiner—Thomas R. Hannon
Attorney, Agent, or Firm—Young & Thompson

[57] ABSTRACT

A rolling element bearing comprises at least two bearing rings (1, 2; 14, 15; 21, 22, 23) enclosing a bearing space (40), which bearing space (40) contains rolling elements (3, 13, 41), a cage (50, 16, 36) and lubrication structures having a porous matrix (8, 11; 17, 18; 36) containing oil and accommodated between bearing rings, cage and/or rolling elements. In order to obtain a better lubrication for an improved useful service life, the porous matrix (8, 11; 17, 18; 36) is connected to a rotatable bearing element such as a cage (50, 16, 36), a seal (4, 5) or a ring (22, 23, 24) in such a way that it does not physically contact another bearing element and that no frictional forces are generated with respect to such other bearing element, whereby upon rotation of the bearing element carrying the matrix the oil is driven through the matrix under the influence of centrifugal forces and any contaminants contained in the oil are filtered out.

7 Claims, 2 Drawing Sheets

ROLLING ELEMENT BEARING COMPRISING AN OIL CONTAINING MATRIX

The invention relates to a rolling element bearing comprising at least two bearing rings enclosing a bearing space, which bearing space contains rolling elements, a cage and lubrication means having a porous matrix containing oil and accommodated between bearing rings, cage and/or rolling elements Such a bearing is disclosed in "Lubrication Engineering", pages 797–798, October 1991. The matrix consists of a polymer, which is injection moulded or hand packed into the open bearing space and subsequently hardened. By means of the oil contained in the polymer matrix, a better lubrication of the rotating elements is aimed at than was previously possible with grease lubricated bearings.

Furthermore, grease lubricated bearings are known. The functional properties of grease however appears to impose severe limitations on bearing performance. For instance, the life of grease lubricated bearings is reduced as the grease service life is usually much shorter than the fatigue life of the bearings.

Moreover, relubrication by adding fresh grease gives rise to additional problems, in that it requires a special design of the bearing housing, in that aged grease is difficult to remove, and in that after replenishment of the grease stock too much grease may be left in the bearing which leads to increased friction and temperature.

Also, mechanical instability or churning of the grease due to external factors such as vibrations and shocks, and internal factors such as free bearing space available and geometry have a strong effect on internal bearing friction and temperature.

In grease lubrication, satisfactory working conditions can only be obtained if the grease clears itself from the rolling elements and finds a stable location in the bearing free space. During the transition period following the lubrication, the grease is not in a stable position and is circulating among the rolling elements. This effect causes a large increase in temperature and friction, typically with a factor 2.

The above bearing according to the state of the art tries to solve these problems by using oil instead of grease as lubricant. In order to keep the oil in place, it is accommodated in the porous matrix. Nevertheless, such embodiment gives rise to problems as well. If, in spite of the better lubrication, the temperature rises above a certain level, the polymer matrix which is in close contact with the raceways or the rolling elements and which frictionally engages these elements due to its introduction into the bearing by injection moulding or hand packing, starts to disintegrate thus jamming the bearing.

Moreover, the step of injection moulding requires a temporary sealing of the bearing space; a complete filling of the bearing may in certain circumstances, such as a complicated bearing geometry, be difficult to achieve.

The aim of the invention is therefore to provide a bearing of the above type which is less sensitive as regards temperature. This aim is achieved in that the porous matrix is connected to a rotatable bearing element such as a cage, a seal or a ring in such a way that it does not physically contact any other bearing element and that no frictional forces are generated with respect to such other bearing element, whereby upon rotation of the bearing element carrying the matrix the oil is driven through said matrix under the influence of centrifugal forces and any contaminants contained in the oil are filtered out.

Due to the absence of frictional contacts between matrix and moving elements, no additional temperature increases are to be expected in service. Still, the oil is held in close vicinity of these elements, which guarantees proper lubrication by evaporation of oil out of the matrix and condensation of the oil onto the working surfaces.

For example, some of the oil retained in the porous matrix will be relinquished into the bearing space as an oil vapour. Also by centrifugal forces or by the squeeze effect in case of rolling contact the oil will spread.

Part of the (evaporated) oil will condense and subsequently adhere to the bearing surfaces. Thereby, a thin oil film is provided on the moving parts which is just sufficient for an ideal lubrication.

The evaporation and condensation of the oil represent a continuous re-circulation process which ensures that the entire amount of oil available in the matrix will be utilized in lubricating the bearing. In this process, after condensation the oil is filtered when it is driven through the matrix under the influence of centrifugal forces.

The matrix can be introduced into most of the free spaces in the bearing. This means that a larger amount of oil can be accommodated in the same volume as compared to grease. Moreover, the matrix can be positioned along the rolling elements with the aim of providing a reliable oil supply to the middle part of these elements which is generally difficult to achieve in grease lubricated bearings.

A further consequence of the larger amount of oil available in the bearing is the longer service life of the bearing. As moreover the matrix does not interfere with the motion of the moving bearing elements, no mechanical aging process (similar to grease churning) will take place.

The matrix should be stiff enough to keep its shape during service, so as not to get in contact with the moving bearing elements. To that end, the matrix may contain reinforcing fibres for increasing the stiffness of the matrix and preventing deformations thereof under the influence of the centrifugal forces. In this respect, also a sponge-like matrix may be provided or, a mesh-like matrix. In an embodiment, the matrix consists of a sintered material.

The matrix at its parts facing the rings and/or rolling elements may have a relatively low density, and at its supporting parts a relatively high density. Such embodiment may for instance be integrated in a bearing cage obtained by a sintering process.

Preferably, the matrix contains magnetic particles. Ferromagnetic wear particles released by the rings or entering from the environment may be easily trapped in the porous matrix by magnetic forces. Thus, an improved filtering capacity of the oil in the bearing can be obtained.

The invention will now be explained further with reference to several embodiments shown in the figures.

Figure 1:
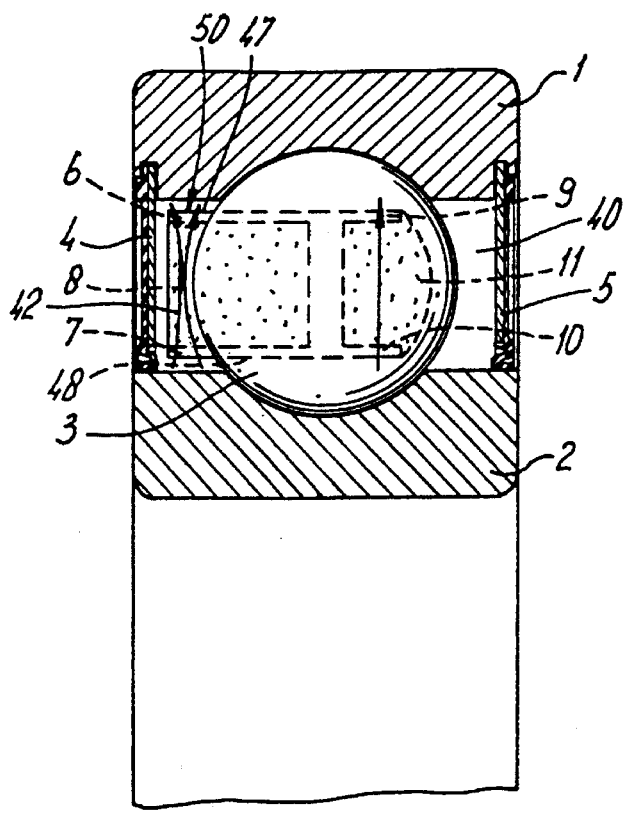
FIG. 1 shows a cross section of a first embodiment of a bearing containing an oil filled matrix.

In FIG. 1, a ball bearing is shown having a outer ring 1, an inner ring 2, and ball shaped rolling elements 3 accommodated in the space between the rings 1 and 2. In the usual way, seals 4 and 5 are provided. Moreover, the balls 3 are kept at a distance from each other by cage 50.

This cage 50 is provided with flanges 6, 7, which enclose a space in which a porous matrix 8 is contained. This porous matrix fills the space between the balls, however without touching them. The matrix contains an amount of oil in its pores. The cage 50 has further flanges 9, 10, which enclose a space with a further porous matrix 11.

The oil which fills the pores in the matrices 8, 11 is able to evaporate from the pores, for instance when the bearing temperature rises. Subsequently, the evaporated oil condenses on the balls 3 and the raceways of rings 1 and 2, leaving behind a thin oil medium film which is very suitable for lubricating these moving parts.

Upon rotation of the cage 50, centrifugal forces start to develop under the influence of which the oil migrates towards the outer ring, as indicated by arrows 42. The oil finally emanates at the outer surface 47 of the matrices 8, 11, and will subsequently be deposited onto the raceway of the outer ring 1 by evaporation or by dripping from said outer surface 47.

Also, the oil will be deposited on the raceway of the inner ring 2 once the full bearing space 40 becomes saturated with evaporated oil. The oil cycle is completed once it evaporates from the inner ring 2 or is flung away therefrom, and is collected on the inner surface 48 of the matrices 8, 11 for migration towards the outer surface 47 of the matrices 8, 11. At the same time as the oil migrates through the matrix, any contaminations in the oil are filtered out. Thus, the oil leaving the matrix is relatively clean which results in an improved useful service life of the bearing.

Figure 2:
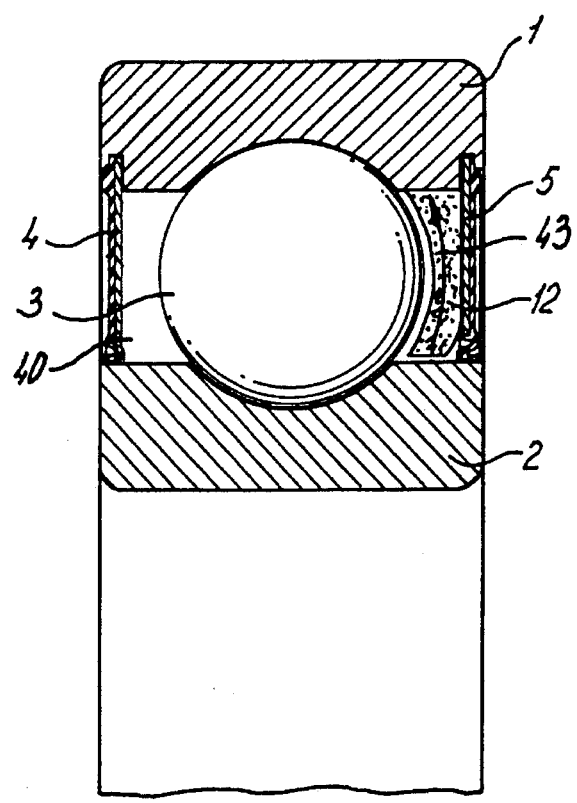
FIG. 2 shows a cross section of a second embodiment.

As shown in FIG. 2, also a porous matrix 12 may be attached to sealing ring 5. The shape of the porous matrix 12 facing the balls 3 is cylindrical, in such a way that the balls do not touch matrix 12.

The migration of the oil under the influence of centrifugal forces is indicated by arrows 43.

Figure 3:
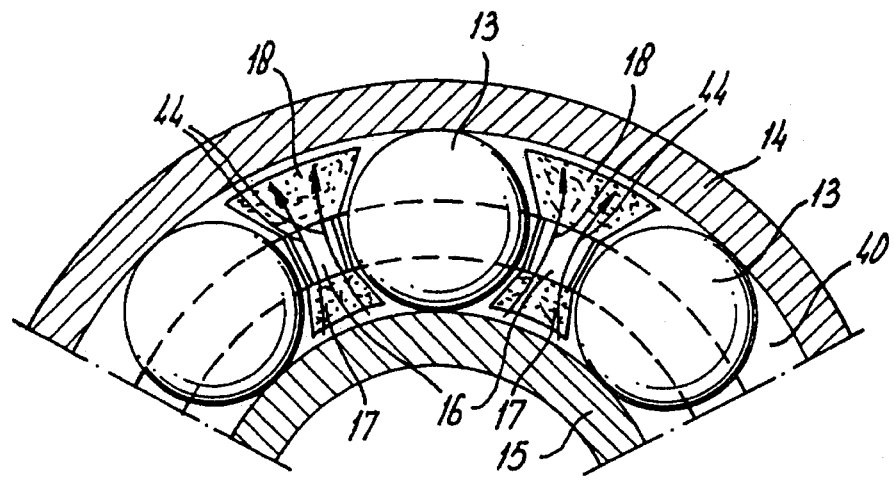
FIG. 3 shows a side view of a third embodiment.

In the embodiment shown in FIG. 3, balls 13 are contained between an outer ring 14 and an inner ring 15 by means of cage 16. These balls are kept at a distance from each other by cage 16. At the inside and outside, in radial direction, of cage 16 porous matrices 17 respectively 18 are provided. They are held at a distance from both the rings 14 and 15, as well as from balls 13. Oil migration is indicated by arrows 44.

Figure 4:
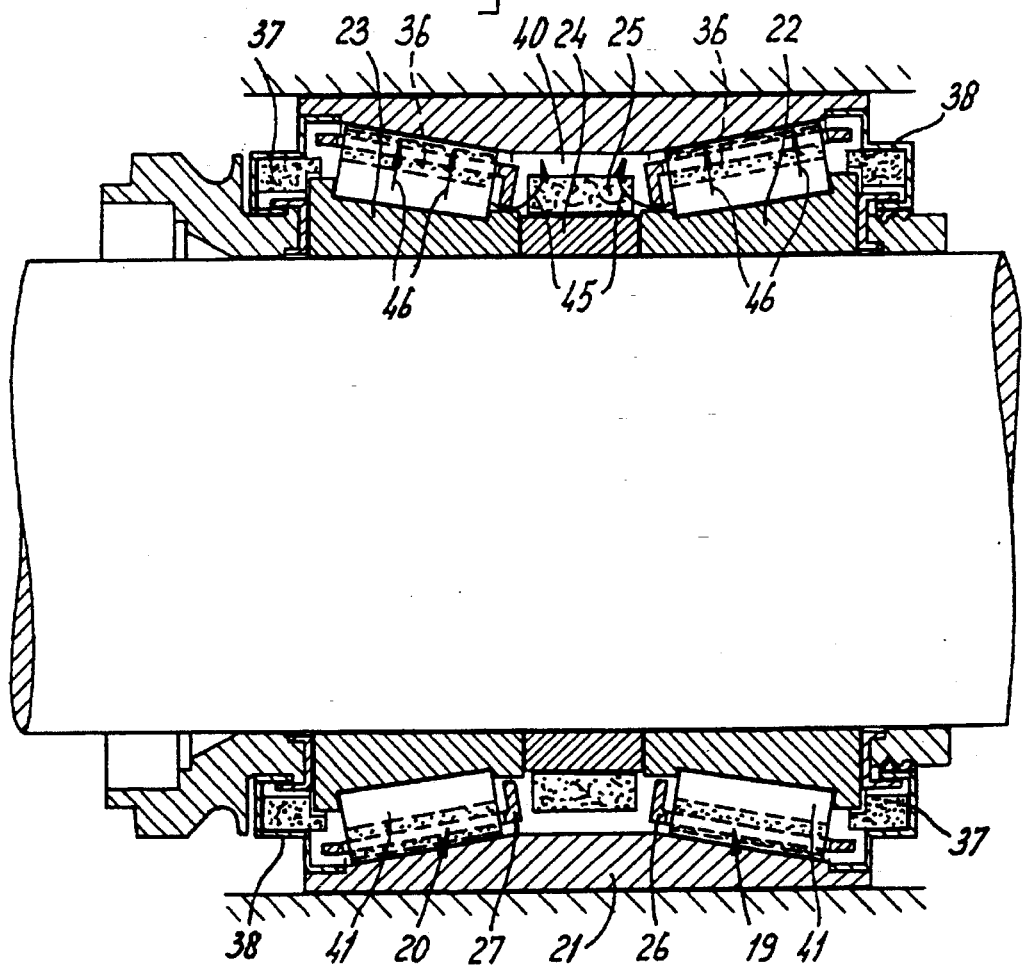
FIG. 4 shows a taper bearing unit.

The tapered bearing unit shown in FIG. 4 comprises two tapered bearings 19, 20, having a common outer ring 21. Moreover, separate inner rings 22 respectively 23 are provided, enclosing a ring 24. At the outside of ring 24 a porous matrix 25 is provided. The porous matrix 25 is at a distance from outer ring 21, as well as at a distance from the cages 26 respectively 27 of the bearings 19 respectively 20. Furthermore, porous matrices 37 may be provided within sealing rings 38.

It is to be noted that these cages 26, 27 may themselves be manufactured from a porous sintered material. In that case, the cages themselves will have matrix-like parts 36, containing oil in their pores.

The migration of oil under the influence of centrifugal forces is in the various parts is indicated by arrows 45, 46.

We claim:

1. In a rolling element bearing comprising at least two bearing rings (1, 2; 14, 15; 21, 22, 23) enclosing a bearing space (40), which bearing space (40) contains rolling elements (3, 13, 41), a cage (50, 16, 36) and lubrication means having a porous matrix (8, 11; 17, 18; 36) containing oil and accommodated within the bearing; the improvement wherein the porous matrix (8, 11; 17, 18; 36) is connected to a rotatable bearing element in such a way that it does not physically contact any other bearing element and that no frictional forces are generated with respect to any other bearing element, whereby upon rotation of the bearing element carrying the matrix the oil is driven through said matrix under the influence of centrifugal forces and any contaminants contained in the oil are filtered out.

2. Bearing according to claim 1, wherein the matrix contains reinforcing fibres for increasing the stiffness of the matrix and preventing deformations thereof under the influence of the centrifugal forces.

3. Bearing according to claim 1, wherein the matrix at its out parts has a relatively low density and at its supporting parts which are connected to the carrying element has a relatively high density.

4. Bearing according to claim 1, wherein a sponge-like matrix is provided.

5. Bearing according to claim 1, wherein a mesh-like matrix is provided.

6. Bearing according to claim 1, wherein the matrix consists of a sintered material.

7. Bearing according to claim 1, wherein the matrix contains magnetic particles.

* * * * *